(12) United States Patent
Tsunooka et al.

(10) Patent No.: US 7,270,095 B2
(45) Date of Patent: Sep. 18, 2007

(54) APPARATUS AND METHOD FOR CONTROLLING INTERNAL COMBUSTION ENGINE

(75) Inventors: Takashi Tsunooka, Gotenba (JP); Masashi Hakariya, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 52 days.

(21) Appl. No.: 11/295,525

(22) Filed: Dec. 7, 2005

(65) Prior Publication Data

US 2006/0130806 A1    Jun. 22, 2006

(30) Foreign Application Priority Data

Dec. 17, 2004   (JP)   ............................. 2004-365991

(51) Int. Cl.
*F01L 1/34*    (2006.01)
*F02M 7/00*    (2006.01)
(52) U.S. Cl. .................................. 123/90.15; 123/435
(58) Field of Classification Search ................ 123/435, 123/673, 321, 322, 90.1, 90.15, 399
See application file for complete search history.

(56) References Cited

U.S. PATENT DOCUMENTS

| | | | |
|---|---|---|---|
| 4,479,471 A * | 10/1984 | Hasegawa et al. ..... | 123/339.22 |
| 5,092,301 A * | 3/1992 | Ostdiek ....................... | 123/480 |
| 5,635,634 A | 6/1997 | Reuschenbach et al. | |
| 5,846,157 A * | 12/1998 | Reinke et al. ................ | 477/48 |
| 6,587,769 B2 | 7/2003 | Otterbach et al. | |
| 2002/0166539 A1 | 11/2002 | Gaessler et al. | |
| 2002/0177933 A1 | 11/2002 | Otterbach et al. | |
| 2005/0039723 A1* | 2/2005 | Miura ........................ | 123/435 |
| 2005/0065707 A1 | 3/2005 | Kaga | |

FOREIGN PATENT DOCUMENTS

| | | |
|---|---|---|
| DE | 43 25 902 A1 | 2/1995 |
| DE | 100 64 651 A1 | 7/2002 |
| EP | 1 247 967 A | 10/2002 |
| EP | 1 375 881 A | 1/2004 |
| JP | A 2001-234798 | 8/2001 |
| JP | A 2002-070633 | 3/2002 |
| JP | A 2004-084637 | 3/2004 |

\* cited by examiner

*Primary Examiner*—John T. Kwon
(74) *Attorney, Agent, or Firm*—Oliff & Berridge, PLC

(57) ABSTRACT

An engine body includes a plurality of cylinders, and the intake valve lift-amount of each cylinder is changed based on the engine operating state. A pressure sensor continuously detects the intake pressure, which is the pressure in an intake pipe, to detect the intake pressure decrease amount, which is the amount of decrease in the intake pressure caused due to execution of the intake stroke, of each cylinder. The air quantity variation correction coefficient, which is used to compensate for the variation in the in-cylinder supplied-air quality with each cylinder, is calculated based on the detected intake pressure decrease amount, and the fuel injection amount is corrected using the air quantity variation correction coefficient.

15 Claims, 14 Drawing Sheets

F I G . 13
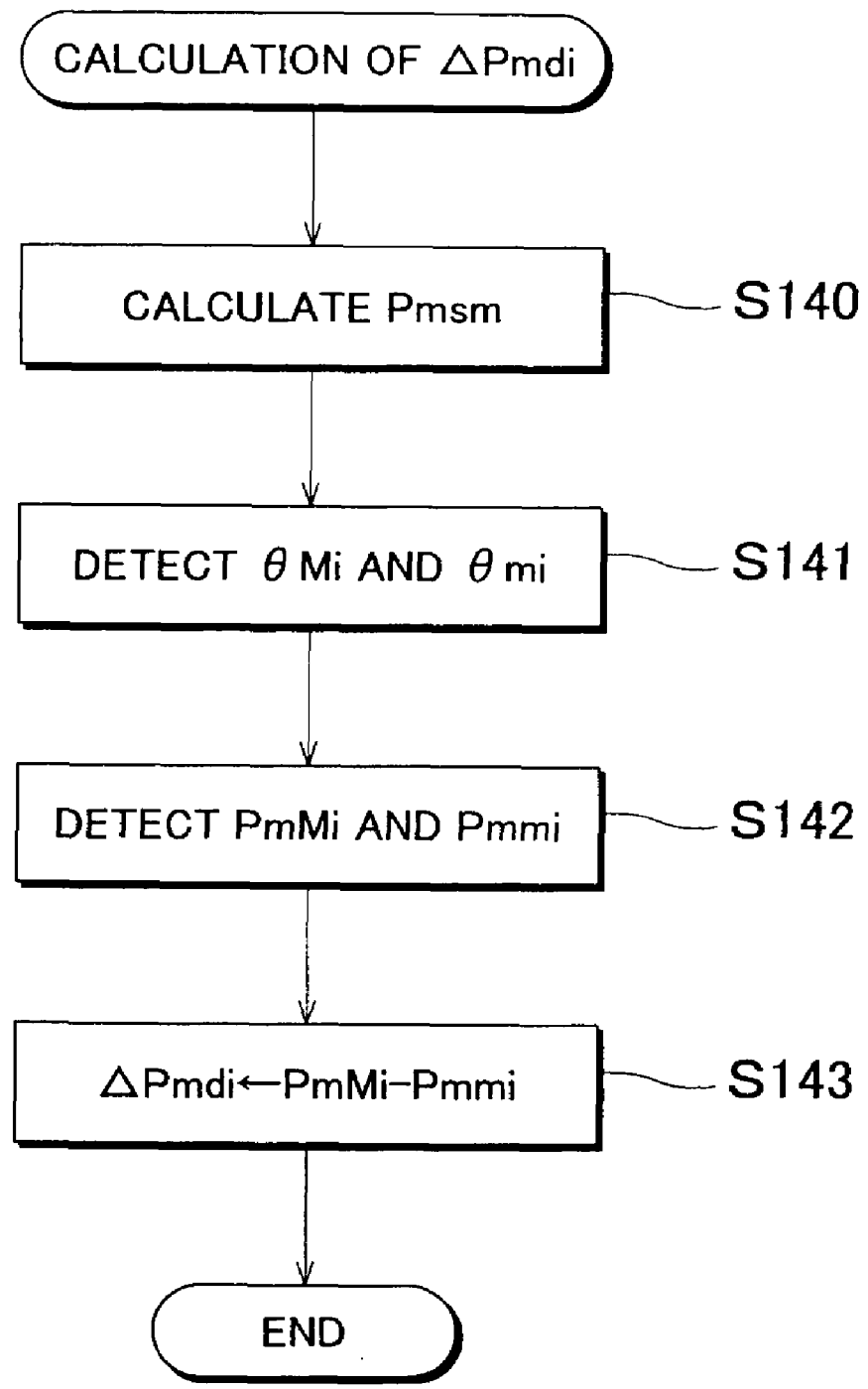

APPARATUS AND METHOD FOR CONTROLLING INTERNAL COMBUSTION ENGINE

INCORPORATION BY REFERENCE

The disclosure of Japanese Patent Application No. 2004-365991 filed on Dec. 17, 2004 including the specification, drawings and abstract is incorporated herein by reference in its entirety.

BACKGROUND OF THE INVENTION

1. Field of the Invention

The invention relates to an apparatus and method for controlling an internal combustion engine.

2. Description of the Related Art

As described in, for example, Japanese Patent Application Publication No. JP-A-2004-84637, an internal combustion engine, in which a plurality of cylinders is provided and the lift-amount of the intake valve of each cylinder is changed based on the engine operating state, is known. In the described internal combustion engine, the quantity of air that passes through a throttle valve is detected by an airflow meter; the intake pulsation amount, corresponding to the fluctuation range of the detected quantity of air, is calculated for each cylinder; and the variation in the intake valve lift-amount with each cylinder is detected based on the intake pulsation amount of each cylinder. In such an internal combustion engine, the above-mentioned structure is employed, because, if the intake valve lift-amount varies with each cylinder, the quantity of air taken in an individual cylinder varies with each cylinder, and therefore, the intake pulsation amount varies with each cylinder.

However, because the quantity of air that passes through the throttle valve does not always match the quantity of air taken in each cylinder, the intake pulsation amount, corresponding to the fluctuation range of the quantity of air that passes through the throttle valve, may not accurately indicate the variation in the intake valve lift-amount with each cylinder. In this case, even if, for example, the air-fuel ratio is corrected based on the detected variation in the intake valve lift-amount with each cylinder, correction of the air-fuel ratio may be inaccurate.

SUMMARY OF THE INVENTION

It is an object of the invention to provide an apparatus and method for controlling and accurately compensating for variations in the quantity of air supplied to the individual cylinders in an internal combustion engine.

A first aspect of the invention relates to a control apparatus for an internal combustion engine in which a plurality of cylinders is provided and the intake valve lift-amount of each cylinder is changed based on the engine operating state. The control apparatus includes decrease amount detecting device for detecting the intake pressure decrease amount corresponding to each of the cylinders, the intake pressure decrease amount being the amount of decrease in an intake pressure caused due to execution of an intake stroke; variation calculating device for calculating the variation in the in-cylinder supplied-air quantity, which is the quantity of air supplied in each cylinder, with each cylinder based on the detected intake pressure decrease amounts corresponding to the respective cylinders; and control device for executing engine control based on the calculated variation in the in-cylinder supplied-air quantity with each cylinder.

A second aspect of the invention relates to a control method for an internal combustion engine in which a plurality of cylinders is provided and an intake valve lift-amount of each cylinder is changed based on the engine operating state. The control method includes; detecting the intake pressure decrease amount, corresponding to each of the cylinders, the intake pressure decrease amount being the amount of decrease in an intake pressure caused due to execution of an intake stroke; calculating the variation in the in-cylinder supplied-air quantity, which is the quantity of air supplied in each cylinder, with each cylinder based on the detected intake pressure decrease amounts corresponding to the respective cylinders; and executing engine control based on the calculated variation in the in-cylinder supplied-air quantity with each cylinder.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 13 illustrates the flowchart of the routine for calculating an intake pressure decrease amount $\Delta Pmdi$ in the third modified example of the embodiment;

DETAILED DESCRIPTION OF THE EXEMPLARY EMBODIMENTS

Figure 1:
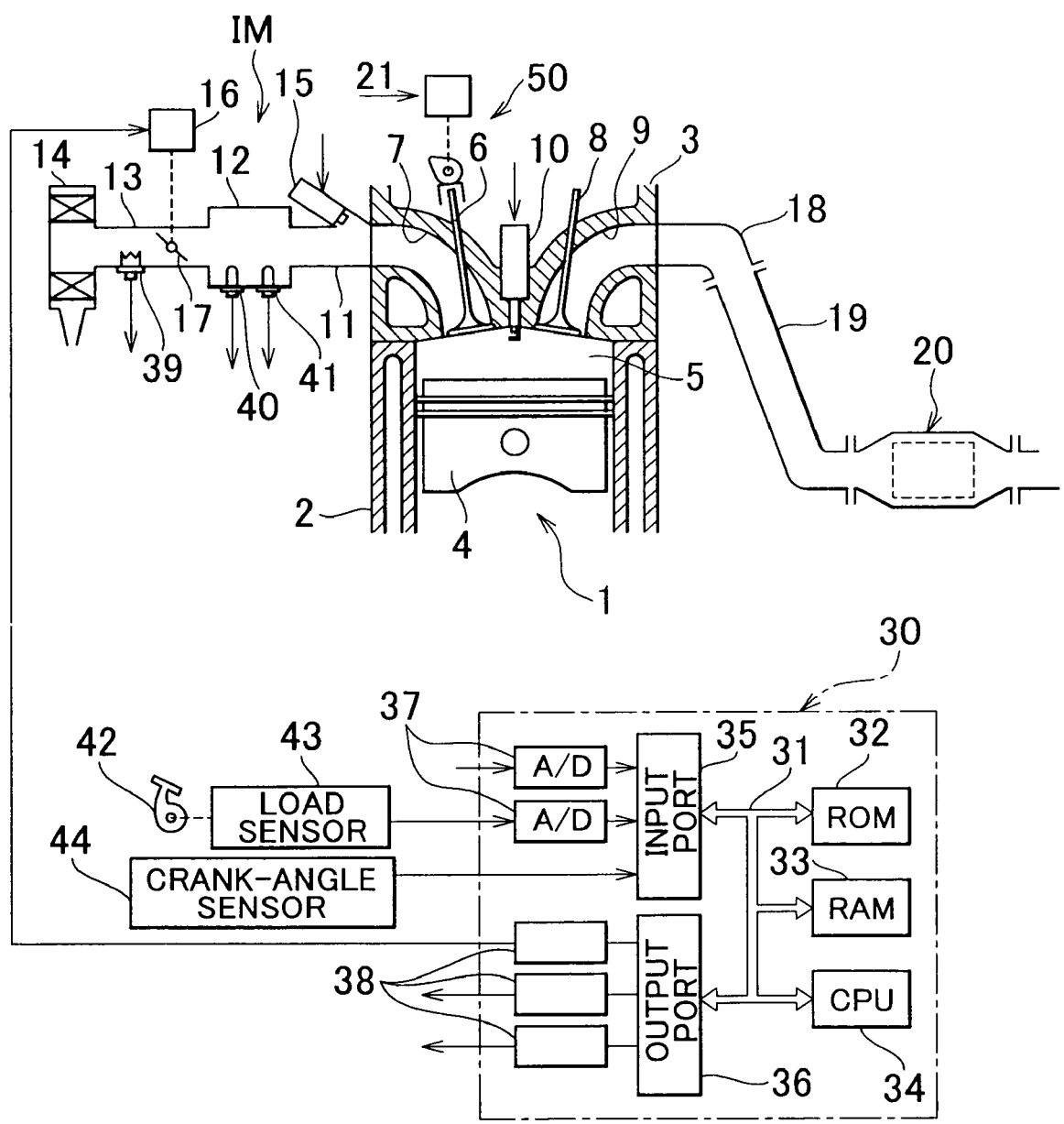
FIG. 1 illustrates the general view of an internal combustion engine.

FIG. 1 shows the case where the invention is applied to a spark-ignition internal combustion engine. However, the invention may also be applied to a compression-ignition internal combustion engine.

FIG. 1 shows an engine 1 provided with, for example, eight cylinders; a cylinder block 2; a cylinder head 3; a piston 4; a combustion chamber 5; an intake valve 6; an intake port 7; an exhaust valve 8; an exhaust port 9; and a spark plug 10. The intake port 7 is connected to a surge tank 12 via a corresponding intake branch pipe 11. The surge tank 12 is connected to an air cleaner 14 via an air intake duct 13. A fuel injection valve 15 is provided in each intake branch pipe 11. A throttle valve 17 driven by a step motor 16 is provided in the air intake duct 13.

Note that, in the specification, a part of the air intake duct 13, which is positioned downstream of the throttle valve 17, the surge tank 12, the intake branch pipe 11, and the intake port 1 will be collectively referred to as an intake pipe IM.

The exhaust port 9 is connected to a catalytic converter 20 via an exhaust manifold 18 and an exhaust pipe 19. Communication is provided between the catalytic converter 20 and the outside air via a muffler (not shown). In the internal combustion engine shown in FIG. 1, the intake stroke is executed in the following cylinder order: #1-#8-#4-#3-#6-#5-#7-#2.

An electronic control unit (hereinafter, referred to as an "ECU") 30 is formed of a digital computer, and includes ROM (read-only-memory) 32, RAM (random-access-memory) 33, a CPU (microprocessor) 34, an input port 35 and an output port 36 that are connected to each other by a bidirectional bus 31. An airflow meter 39, which detects the flow-rate of the air flowing through the intake passage of the engine, is attached to the air intake duct 13 at a position upstream of the throttle valve 17. An outside-air-temperature sensor is embedded in the airflow meter 39. A pressure sensor 40 and a temperature sensor 41 are attached to the surge tank 12. The pressure sensor 40 detects a pressure in the intake pipe IM (hereinafter, this pressure will be referred to as an "intake pressure Pm" (kpa)) at time intervals of, for example, 10 ms. The temperature sensor 41 detects a temperature of the air present in the intake pipe IM (hereinafter, this temperature will be referred to as an "intake temperature Tm" (K)). A load sensor 43, which detects a depression amount ACC of an accelerator pedal 42, is connected to the accelerator pedal 42. The signals output from these sensors 39, 40, 41 and 43 are input in the input port 35 via respective A/D converters 37. A crank angle sensor 44, which generates output pulses at predetermined crank angle intervals of, for example, 30 degrees, is connected to the input port 35. The CPU 34 calculates an engine speed NE based on the output pulses from the crank angle sensor 44. The output port 36 is connected to the spark plug 10, the fuel injection valve 15, the step motor 16, and an intake valve lift-amount changing device 21 via respective drive circuits 38. These components 10, 15, 16, and 21 are controlled based on the signals output from the ECU 30.

Figure 2:
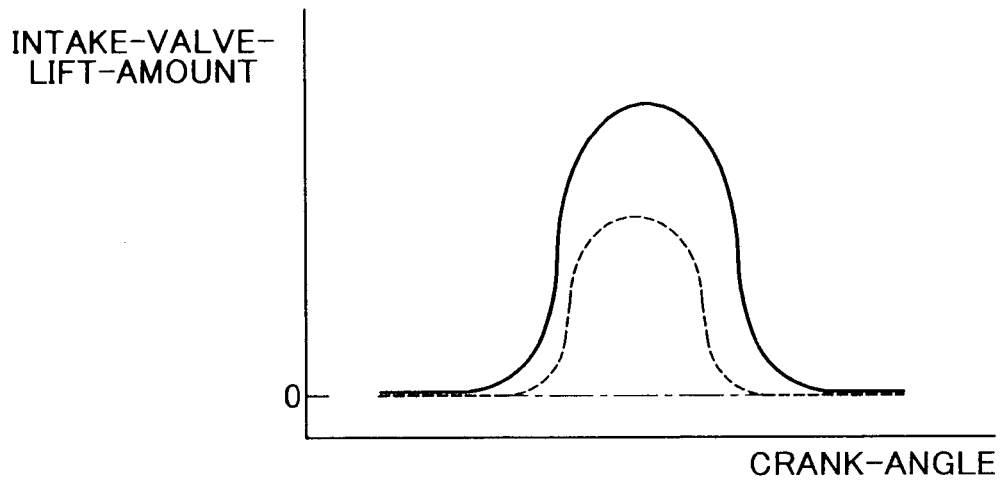
FIG. 2 illustrates the graph of an intake valve lift-amount.

The intake valve 6 of each cylinder is opened/closed by an intake valve drive unit 50. The intake valve drive unit 50 includes a camshaft that is provided with, for example, a high-lift-profile cam and a low-lift-profile cam; and the intake valve lift-amount changing device 21 that selectively changes the cam that drives the intake valve 6 between the high-lift-profile cam and the low-lift-profile cam. When the intake valve 6 is driven by the high-lift-profile cam, the lift-amount of the intake valve 6 (hereinafter, this lift amount will be referred to as the "intake valve lift-amount") is increased as shown by the solid line in FIG. 2, and the period in which the intake valve 6 is open (hereinafter, this period will be referred to as the "intake valve open period") and the working angle of the cam are increased. On the other hand, when the intake valve 6 is driven by the low-lift-profile cam, the intake valve lift-amount is decreased as shown by the dashed line in FIG. 2, and the intake valve open period and the working angle of the cam are decreased. Namely, if the cam that drives the intake valve 6 is changed, the intake valve lift-amount and the intake valve open period are changed. Also, the timing at which the intake valve 6 is opened is also changed.

In the embodiment of the invention, usually, the intake valve 6 is driven by the high-lift-profile cam (i.e., the high-lift operation is performed), and the cam that drives the intake valve 6 is changed to the low-lift-profile cam (i.e., the manner in which the intake valve 6 is driven is changed to the low-lift operation) when the engine starts running at low load, for example, when the engine starts running at idle. Thus, the intake air-quantity can be decreased even if the opening amount of the throttle valve 17 is not decreased when the engine is running at low load. As a result, the pumping-loss can be reduced. The invention can be applied also to the case where the intake valve drive unit 50 continuously changes the intake valve lift-amount and the intake valve open period (working angle).

In the embodiment of the invention, a fuel injection time TAUi of an "i"th cylinder ("i"=1, 2, 3, 4, 5, 6, 7, 8) is calculated according to the following equation (1).

$$TAUi = TAUb \times kDi \times kk \qquad (1)$$

Here, "TAUb" indicates the base fuel injection time, "kDi" indicates an air quantity variation correction coefficient of the "i" th cylinder (hereinafter, this correction coefficient will be referred to as the "air quantity variation correction coefficient), and "kk" indicates another correction coefficient.

The base fuel injection time TAUb is the time required to match the air-fuel ratio to the target air-fuel ratio. The base fuel injection time TAUb is obtained, in advance, as the function of the engine operating state, e.g. the depression amount ACC of the accelerator pedal 42 and the engine speed NE, and stored in the ROM 32 in the form of a map.

The quantity of air that has been supplied in the "i"th cylinder until end of the intake stroke will be referred to as an in-cylinder supplied-air quantity Mci (g). In this case, the air quantity variation correction coefficient kDi is used to compensate for the variation in the in-cylinder supplied-air quantity Mci with each cylinder. The correction coefficient kk collectively indicates the coefficient for correcting the air-fuel ratio, the coefficient for correcting the increase in acceleration, and the like. When no correction to these values is needed, the correction coefficient kk is set to "1.0".

If the intake valve lift-amount varies with each cylinder, the in-cylinder supplied-air quantity Mci also varies with each cylinder. As a result, the output torque also varies with each cylinder. Deposits mainly containing carbon may form on the inner surface of the intake pipe IM and the outer surface of the intake valve 6. The amount of the deposits will generally vary with each cylinder. Thus, these deposits may also cause variations in the in-cylinder supplied-air quantity Mci with each cylinder. This becomes a problem particularly in the low-lift operation in which the in-cylinder supplied-air quantity Mci is small.

Accordingly, in the embodiment of the invention, the air quantity variation correction coefficient kDi is used to compensate for the variation in the in-cylinder supplied-air quantity with each cylinder.

The air quantity variation correction coefficient kDi of the "i"th cylinder is calculated according to the following equation (2).

$$kDi = \Delta Pmdi / \Delta Pmdav \qquad (2)$$

Here, "ΔPmdi" indicates the amount of decrease in the intake pressure Pm due to execution of the intake stroke in the "i"th cylinder (hereinafter, this amount will be referred to as the "intake pressure decrease amount ΔPmdi"). "ΔPmdav" indicates the average value of the intake pressure decrease amounts "ΔPmdi" (=ΣΔPmdi/Ncyl; "Ncyl" indicates the number of cylinders. For example, "Ncyl" is "8" in the internal combustion engine in FIG. 1).

Next, the intake pressure decrease amount ΔPmdi will be described with reference to FIGS. 3 to 5.

Figure 3:
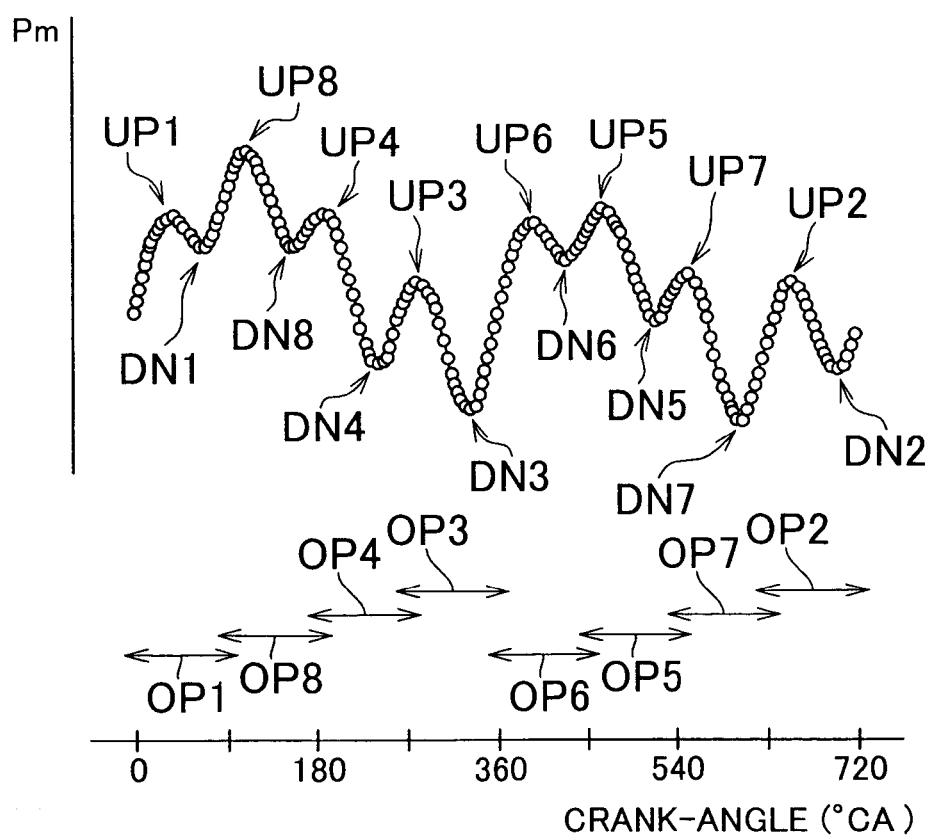
FIG. 3 illustrates the result of detection of an intake pressure Pm.

FIG. 3 shows the intake pressure Pm that is detected by the pressure sensor 40 at predetermined time intervals while the crankshaft rotates through 720 degrees. In FIG. 3, "OPi" (i=1, 2, 3, 4, 5, 6, 7, 8) indicates the intake valve open period of the "i"th cylinder. The crank angle of "0" degrees corresponds to the intake top dead center of the first cylinder #1. As shown in FIG. 3, after the intake stroke is started in one cylinder, the intake pressure Pm increases and then starts decreasing, and an intake pressure peak occurs in the intake pressure Pm after a while. The intake pressure Pm further decreases, and then starts increasing again. Then, an intake pressure trough occurs in the intake pressure Pm after a while. In this manner, intake pressure peaks and intake pressure troughs alternately occur in the intake pressure Pm. In FIG. 3, "UPi" indicates an intake pressure peak and "DNi" indicates an intake pressure trough, which occur in the intake pressure Pm due to execution of the intake stroke in the "i"th cylinder.

Figure 4:
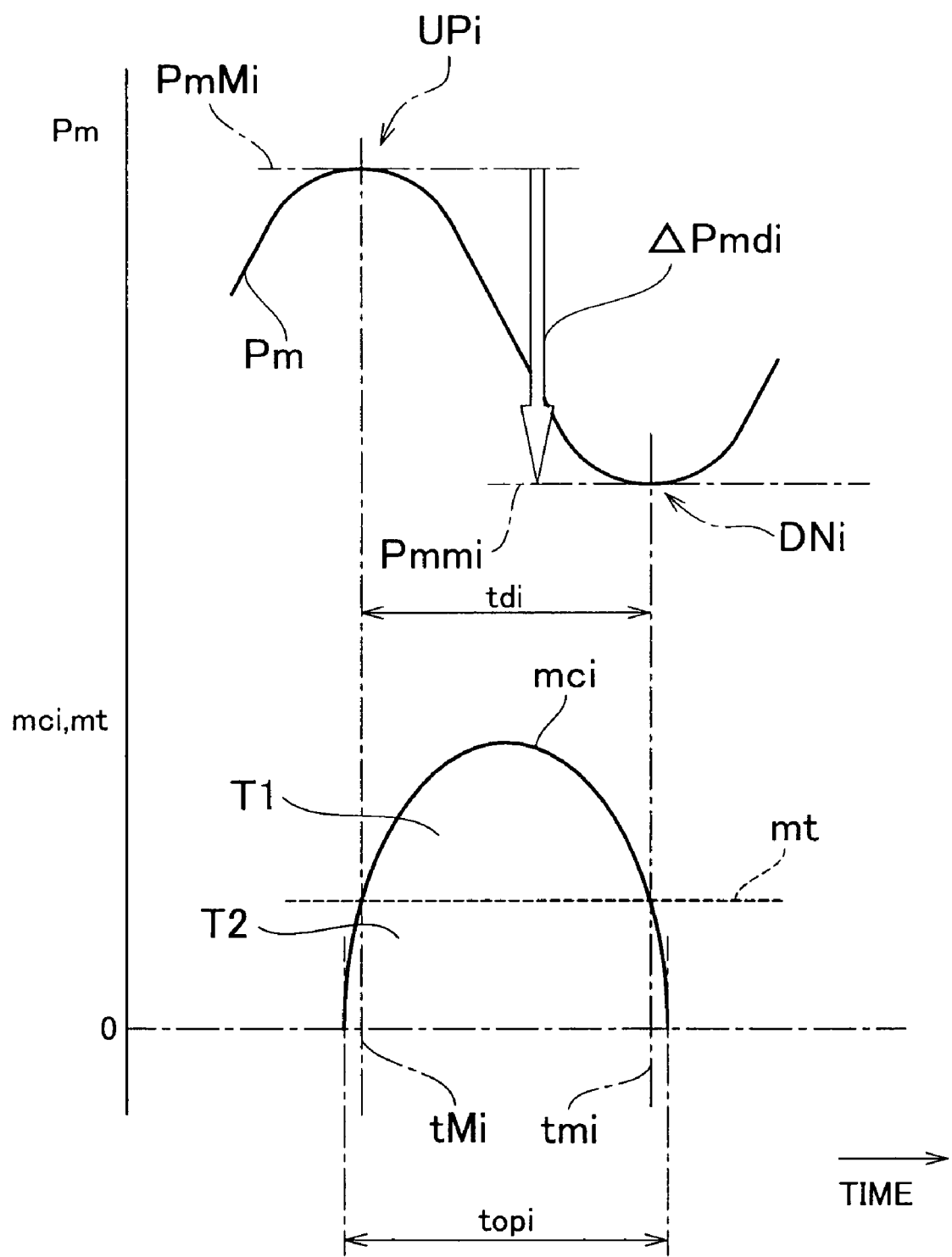
FIG. 4 illustrates the view for describing an intake pressure decrease amount $\Delta Pmdi$.

As shown in FIG. 4, the intake pressure Pm obtained at the intake pressure peak UPi is a maximum value PmMi, and the intake pressure Pm obtained at the intake pressure trough DNi is a minimum value Pmmi. In this case, if the intake stroke is executed in the "i"th cylinder, the intake pressure Pm decreases from the maximum value PmMi to the minimum value Pmmi. Accordingly, the intake pressure decrease amount ΔPmdi in this case is calculated according the following equation (3).

$$\Delta Pmdi = PmMi - Pmmi \quad (3)$$

Figure 5:
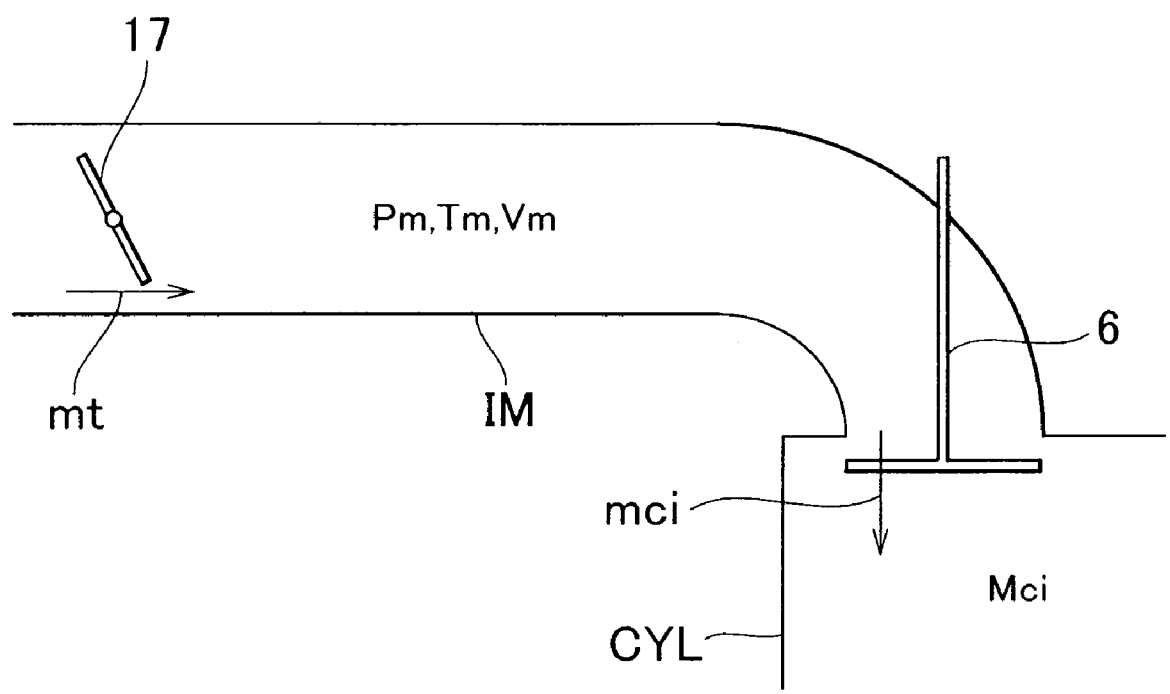
FIG. 5 illustrates the view used for describing the method of calculating an in-cylinder supplied-air quantity $Mci$.

As shown in FIGS. 4 and 5, when the intake valve 6 is opened, the flow-rate of the air that flows out of the intake pipe IM and taken into the cylinder CYL (hereinafter, this flow-rate will be referred to as an "in-cylinder intake air flow-rate mci" (g/sec)) starts increasing. When the in-cylinder intake air flow-rate mci becomes higher than the flow-rate of the air passing through the throttle valve 17 and flowing in the intake pipe IM (hereinafter, this flow-rate will be referred to as a "throttle valve passing air flow-rate mt" (g/sec)), the intake pressure Pm starts decreasing. When the in-cylinder intake air flow-rate mci decreases to a value lower than the throttle valve passing air flow-rate mt, the intake pressure Pm starts increasing.

In this case, the amount of decrease in the intake pressure Pm due to execution of the intake stroke, that is, the intake pressure decrease amount ΔPmdi is determined based on the in-cylinder intake air flow-rate mci. The in-cylinder supplied-air quantity Mci is obtained by temporally integrating the in-cylinder intake air flow-rate mci. Accordingly, the in-cylinder supplied-air quantity Mci can be indicated by the intake pressure decrease amount ΔPmdi. The variation in the in-cylinder supplied-air quantity Mci with each cylinder can be indicated by the variation in the intake pressure decrease amount ΔPmdi with each cylinder.

Accordingly, in the embodiment of the invention, the intake pressure decrease amount ΔPmdi is detected, and the air quantity variation correction coefficient kDi is calculated based on the intake pressure decrease amount ΔPmdi. More specifically, first, the intake pressure Pm is detected while the crankshaft rotates through 720 degrees, and the maximum value PmMi and the minimum value Pmmi of the "i"th cylinder are obtained based on the detected intake pressure Pm. Next, the intake pressure decrease amount ΔPmdi is calculated according to equation (3), and the air quantity variation correction coefficient kDi is calculated according to equation (2).

The air quantity variation correction coefficient kDi may be calculated based on the in-cylinder supplied-air quantity Mci. In this case, the air quantity variation correction coefficient kDi is calculated according to the following equation (4).

$$kDi = Mci/Mciav \quad (4)$$

Here, "Mciav" indicates the average value of the in-cylinder supplied-air quantities Mci (=ΣMci/Ncyl).

The in-cylinder supplied-air quantity Mci can be obtained, for example, in the following manner. As described above, the in-cylinder supplied-air quantity Mci is obtained by temporally integrating the in-cylinder intake air flow-rate mci. Accordingly, the in-cylinder supplied-air quantity Mci can be expressed by the following equation (5).

$$Mci = \int_{tmi}^{tMi} (mci - mt)dt + mt \cdot \frac{\Delta tdi + \Delta topi}{2} \quad (5)$$

Here, "tMi" indicates the time point at which an intake pressure peak occurs in the intake pressure Pm (hereinafter, this time point will be referred to as an "intake pressure peak caused timing"); "tmi" indicates the time point at which an intake pressure trough occurs in the intake pressure Pm (hereinafter, this time point will be referred to as an "intake pressure trough caused timing"); "Δtdi" indicates the time interval (s) between the timing tMi and the timing tmi; and "Δtopi" indicates the intake valve open period (s) of the "i"th cylinder (refer to FIG. 4).

In equation (5), the first item in the right side indicates the portion shown by T1 in FIG. 4, namely, the area of the portion surrounded by the in-cylinder intake air flow-rate mci and the throttle valve passing air flow-rate mt. Also, the second item in the right side indicates the area shown by T2 in FIG. 4, namely, the area surrounded by the in-cylinder intake air flow-rate mci, the throttle valve passing air flow-rate mt and the straight line at which the intake pressure Pm is "0" (Pm="0"), by approximating this area using a trapezoid.

The energy conservation law of the intake pipe IM is indicated by the following equation (6).

$$\frac{dPm}{dt} = \frac{Ra \cdot Tm}{Vm} \cdot (mt - mci) \quad (6)$$

Here, "Vm" indicates a volume ($m^3$) of the intake pipe IM; and "Ra" indicates a gas-constant per one mol of air or intake gas (refer to FIG. 5).

The intake pressure Pm decreases by the intake pressure decrease amount ΔPmdi between timing tMi and timing tmi. If this is taken into account, equation (5) can be corrected to the following equation (7) using equation (6).

$$Mci = \Delta Pmdi \cdot \frac{Vm}{Ra \cdot Tm} + mt \cdot \frac{\Delta tdi + \Delta topi}{2} \quad (7)$$

Accordingly, if the intake pressure decrease amount ΔPmdi is calculated in the above-mentioned manner, the intake temperature Tm is detected by the temperature sensor 41, the throttle valve passing air flow-rate mt is detected by the airflow meter 39, and the time interval Δtdi (=tmi−tMi) is calculated by detecting the timing tMi and the timing tmi based on the intake pressure Pm, the in-cylinder supplied-air quantity Mci can be calculated according to equation (7). The intake valve open period Δtopi is obtained based on the intake valve lift-amount, and stored in the ROM 32 in advance.

As described so far, the air quantity variation correction coefficient kDi may be calculated based on the intake pressure decrease amount ΔPmdi, according to equation (2). Alternatively, the air quantity variation correction coefficient kDi may be calculated based on the in-cylinder supplied-air quantity Mci, according to equation (4). However, when equation (2) is used, the intake temperature Tm and the throttle valve passing air flow-rate mt need not be detected, and, therefore, the air quantity variation correction coefficient kDi can be easily obtained. The in-cylinder supplied-air quantity Mci is calculated based on the intake pressure decrease amount ΔPmdi. If this is taken into account, the air quantity variation correction coefficient kDi is calculated based directly on the intake pressure decrease amount ΔPmdi when equation (2) is used; and the air quantity variation correction coefficient kDi is calculated based indirectly on the intake pressure decrease amount ΔPmdi when equation (4) is used.

Figure 6:
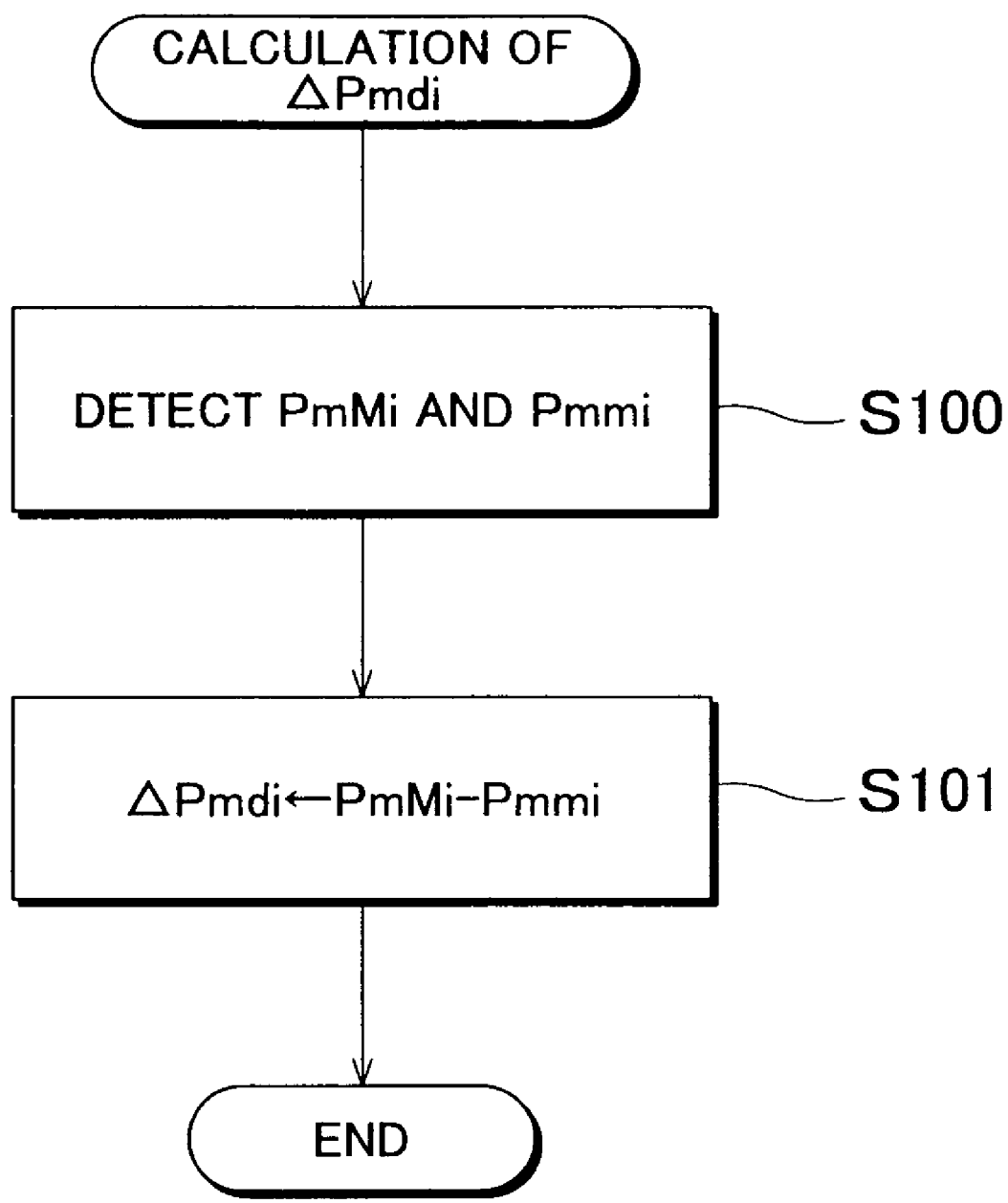
FIG. 6 illustrates the flowchart showing the routine for calculating the intake pressure decrease amount $\Delta Pmdi$.

FIG. 6 illustrates the routine for calculating the intake pressure decrease amount ΔPmdi corresponding to the "i"th cylinder in the embodiment of the invention. This routine is executed as an interrupt at predetermined time intervals.

As shown in FIG. 6, in step S100, the maximum value PmMi and the minimum value Pmmi of the "i"th cylinder are detected ("i"=1, 2, 3, 4, 5, 6, 7, 8). Next, in step S101, the intake pressure decrease amount ΔPmdi is calculated according to equation (3).

Figure 7:
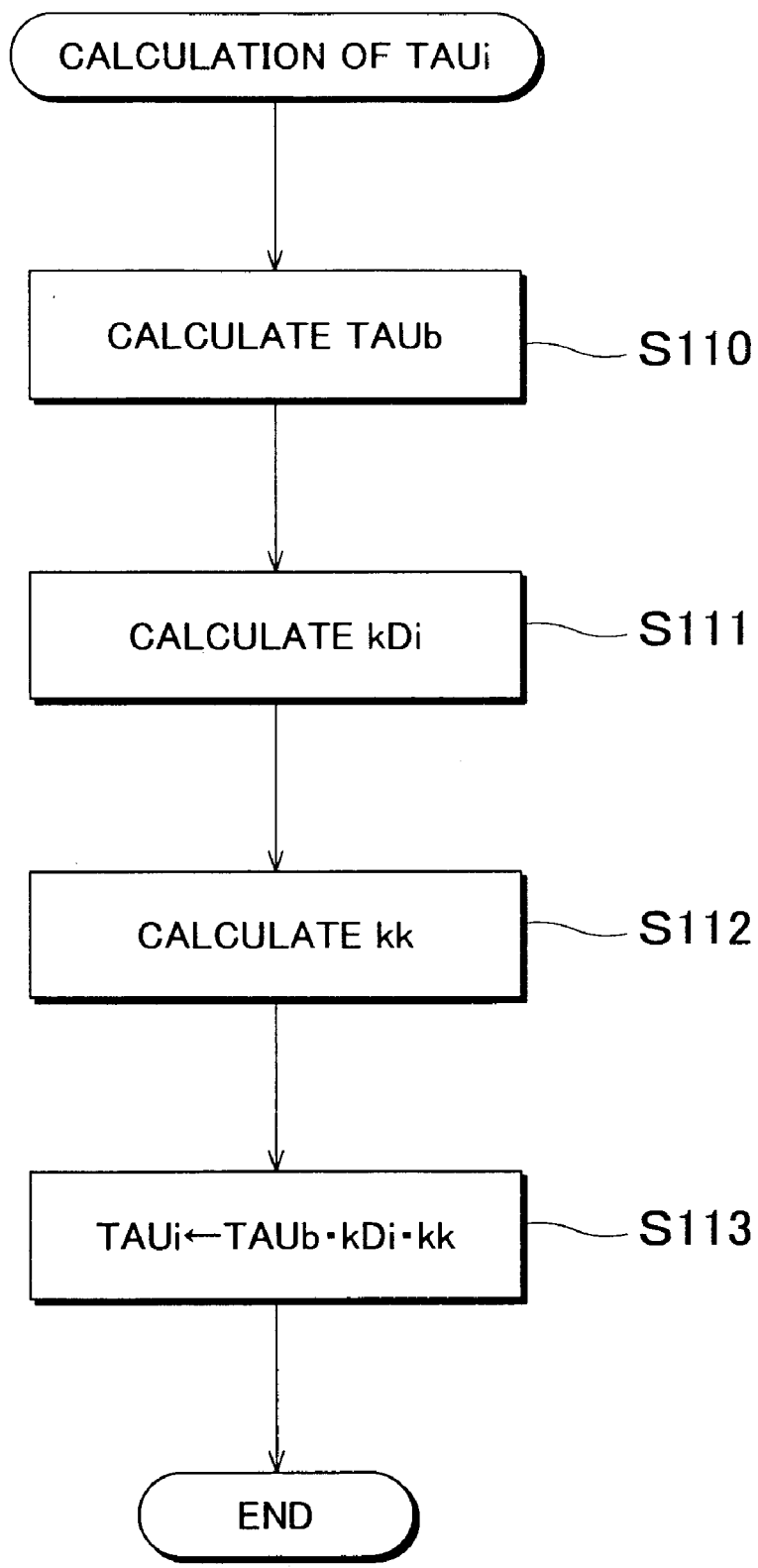
FIG. 7 illustrates the flowchart of the routine for calculating a fuel injection time $TAUi$.

FIG. 7 illustrates the routine for calculating the fuel injection time TAUi of the "i"th cylinder in the embodiment of the invention. This routine is executed as an interrupt at predetermined crank angle intervals.

As shown in FIG. 7, in step S110, the base fuel injection time TAUb is calculated. Next, in step S111, the air quantity variation correction coefficient kDi of the "i"th cylinder ("i"=1, 2, 3, 4, 5, 6, 7, 8) is calculated according to equation (2) or (4). In step S112, the correction coefficient kk is calculated. In step S113, the fuel injection time TAUi is calculated according to equation (1). From the fuel injection valve 15 of the "i"th cylinder, fuel is injected during the fuel injection time TAUi.

As described above, in both the case where equation (2) is used and the case where equation (4) is used, the intake pressure decrease amount ΔPmdi is used, and, therefore, the intake pressure decrease amount ΔPmdi needs to be accurately obtained. Next, first to fourth modified examples of the embodiment for calculating the intake pressure decrease amount ΔPmdi will be described.

First, the first modified example of the embodiment will be described.

Figure 8A:
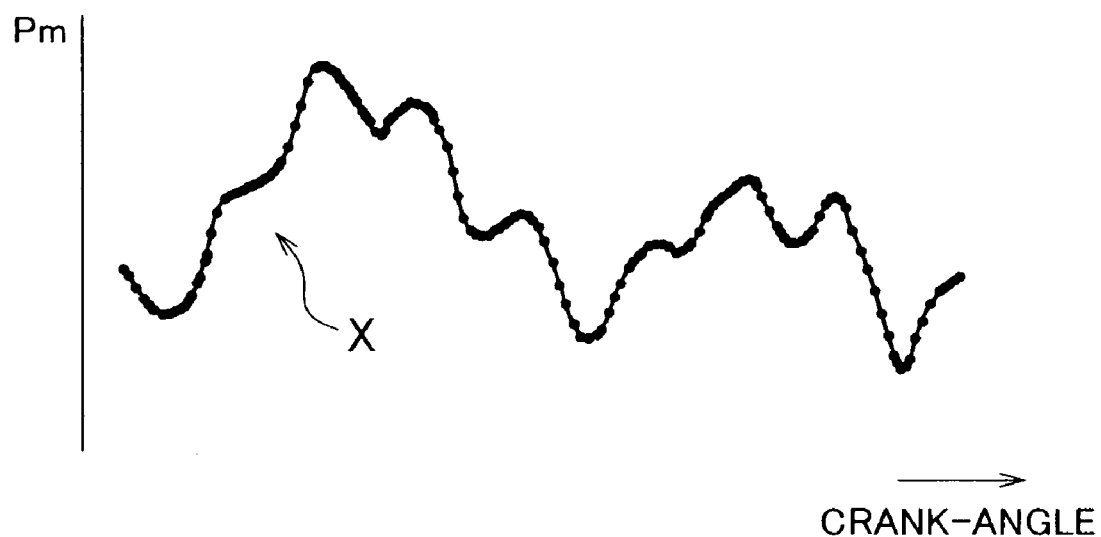
FIGS. 8A and 8B illustrate views used for describing a first modified example of the embodiment.

FIG. 8A shows an example of how the intake pressure Pm changes when the low-lift operation is performed. In the example shown in FIG. 8A, the intake pressure Pm keeps increasing, for example, in the region shown by an arrow X. As a result, either the intake pressure peak UPi or the intake pressure trough DNi does not occur in the intake pressure Pm. Accordingly, the maximum value PmMi and the minimum value Pmmi cannot be detected, and, therefore, the intake pressure decrease amount ΔPmdi cannot be detected. If the intake pressure decrease amount ΔPmdi corresponding to one of the cylinders cannot be detected, the air quantity variation correction coefficient kDi cannot be calculated. It is considered that, the intake pressure Pm behaves in this manner because the in-cylinder supplied-air quantity Mci of this cylinder is considerably less than the in-cylinder supplied-air quantity Mci of each of the other cylinders, and the in-cylinder intake air flow-rate mci does not become higher than the throttle valve passing air flow-rate mt (refer to FIG. 4).

Figure 8B:
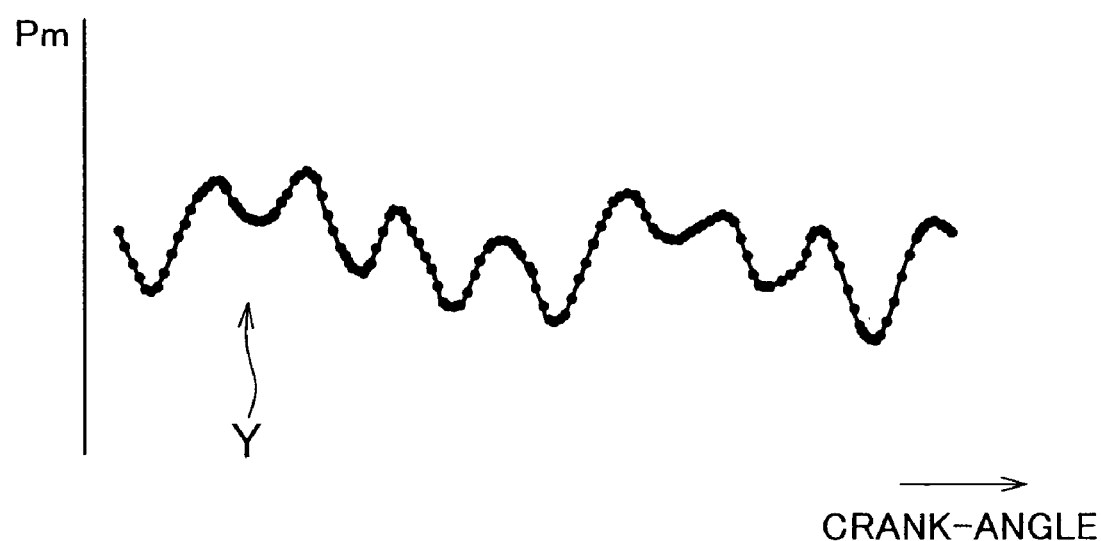

FIG. 8B shows how the intake pressure Pm changes when the high-lift operation is performed under the same engine operating state as in FIG. 8A. In this case, as shown by an arrow Y, the intake pressure peak UPi and the intake pressure trough DNi are clearly caused in the intake pressure Pm, and, therefore, the intake pressure decrease amount ΔPmdi can be detected.

Accordingly, in the first modified example of the embodiment, it is determined whether the intake pressure decrease amount ΔPmdi corresponding to each of the cylinders can be detected. When it is determined that the intake pressure decrease amount ΔPmdi corresponding to at least one of the cylinders cannot be detected, the manner in which the intake valve is driven is temporarily changed to the high-lift operation to detect the intake pressure decrease amount ΔPmdi. Thus, the intake pressure peak UPi and the intake pressure trough DNi are reliably caused in the intake pressure Pm. Accordingly, the maximum value PmMi and the minimum value Pmmi can be reliably detected, and, therefore, the intake pressure decrease amount ΔPmdi can be reliably detected.

In this case, whether the intake pressure decrease amount ΔPmdi can be detected is determined by determining whether both the maximum value PmMi and the minimum value Pmmi can be detected. Namely, when the maximum value PmMi or the minimum value Pmmi cannot be detected, it is determined that the intake pressure decrease amount ΔPmdi cannot be detected. On the other hand, when the maximum value PmMi and the minimum value Pmmi can be detected, it is determined that the intake pressure decrease amount ΔPmdi can be detected.

After detection of the intake pressure decrease amount ΔPmdi is completed, the intake valve 6 is driven normally, namely, the high-lift operation or the low-lift operation are performed depending on the engine operating state.

Figure 9:
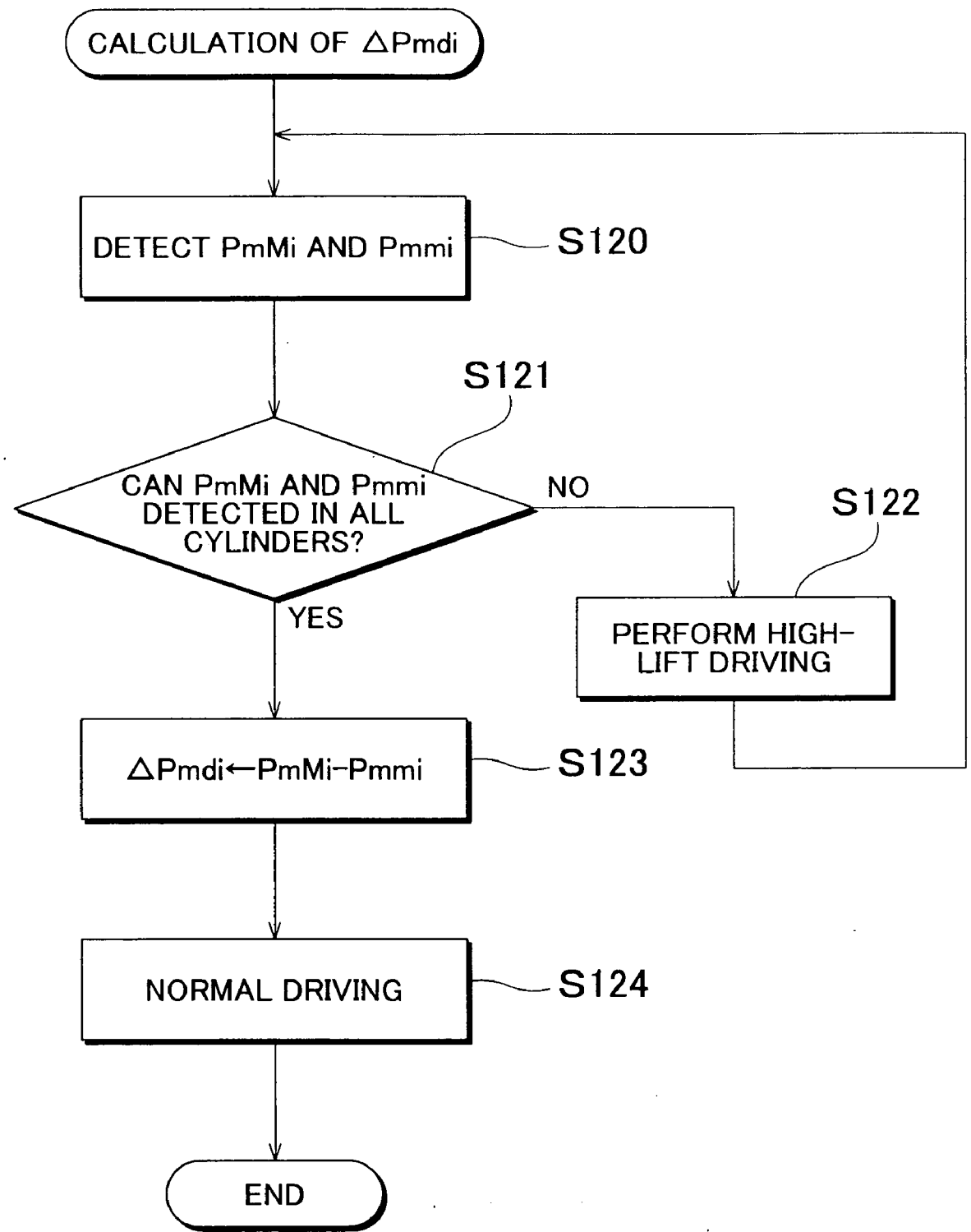
FIG. 9 illustrates the flowchart of the routine for calculating an intake pressure decrease amount $\Delta Pmdi$ in the first modified example of the embodiment.

FIG. 9 illustrates the routine for calculating the intake pressure decrease amount ΔPmdi corresponding to the "i"th cylinder in the first modified example of the embodiment. This routine is executed as an interrupt at predetermined time intervals.

As shown in FIG. 9, in step S120, the maximum value PmMi and the minimum value Pmmi of the "i"th cylinder are detected ("i"=1, 2, 3, 4, 5, 6, 7, 8). Next, in step S121, it is determined whether the maximum value PmMi and the minimum value Pmmi of each of all the cylinders can be detected. If the maximum value PmMi or the minimum value Pmmi of at least one of the cylinders cannot be detected, step S122 is executed. In step S122, the high-lift operation is performed regardless of the engine operating state. Then, step S120 is executed again.

On the other hand, when it is determined in step S121 that the maximum value PmMi and the minimum value Pmmi of each of all the cylinders can be detected, step S123 is executed. In step S123, the intake pressure decrease amount ΔPmdi is calculated according to equation (3). Next, in step S124, the intake valve 6 is driven normally.

It is determined that the intake pressure decrease amount ΔPmdi cannot be detected only when the low-lift operation is performed. If this is taken into account, it may be considered that detection of the intake pressure decrease amount ΔPmdi is prohibited when the low-lift operation is performed in the first modified example of the embodiment.

Next, the second modified example of the embodiment will be described.

In the first modified example of the embodiment described above, even when the low-lift operation should be performed, the manner in which the intake valve is driven is changed to the high-lift operation to detect the intake pressure decrease amount ΔPmdi. Accordingly, additional control, for example, decreasing the opening amount of the throttle valve 17, is required.

Figure 10A:
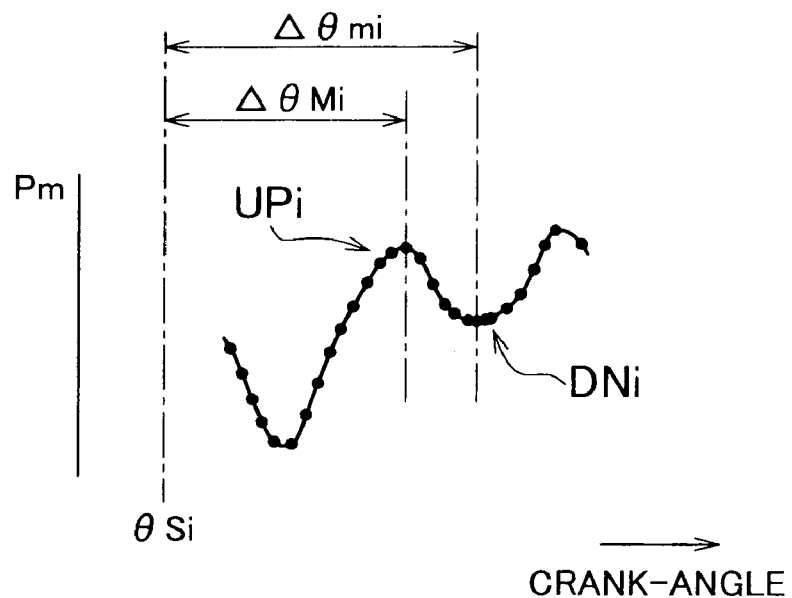
FIGS. 10A and 10B illustrate views used for describing a second modified example of the embodiment.

As shown in FIG. 10A, if the crankshaft has been rotated by a crank angle that is required to cause an intake pressure peak in the intake pressure Pm (hereinafter, this crank angle will be referred to as a "pressure peak crank angle ΔθMi") since the time point at which the intake valve of, for example, the "i"th cylinder started opening (hereinafter, this time point will be referred to as an "intake valve open start timing θSi"), the intake pressure peak Upi is caused in the intake pressure Pm due to execution of the intake stroke in the "i"th cylinder. If the crankshaft is rotated by a crank angle that is required to cause an intake pressure trough in the intake pressure Pm (hereinafter, this crank angle will referred to as a "pressure trough crank angle Δθmi") since the intake valve open start timing θSi, the intake pressure trough DNi is caused in the intake pressure Pm.

Each of the pressure peak crank angle ΔθMi and the pressure trough crank angle Δθmi is maintained at the substantially constant value regardless of whether the high-lift operation is performed or the low-lift operation is performed.

Thus, the intake pressure Pm, which is obtained when the crankshaft has been rotated by the pressure peak crank angle ΔθMi since the intake valve open start timing θSi, is the maximum value PmMi. Similarly, the intake pressure Pm, which is obtained when the crankshaft has been rotated by the pressure trough crank angle Δθmi since the intake valve open start timing θSi, is the minimum valve Pmmi.

Accordingly, if the pressure peak crank angle ΔθMi and the pressure trough crank angle Δθmi are obtained in advance, even when the intake pressure peak UPi or the intake pressure trough DNi does not occur in the intake pressure Pm, the maximum value PmMi and the minimum value Pmmi can be detected using the pressure peak crank angle ΔθMi and the pressure trough crank angle Δθmi, respectively. Thus, the intake pressure decrease amount ΔPmdi can be detected. This is the concept of the second modified example of the embodiment.

As described above, when the high-lift operation is performed, the intake pressure peak UPi and the intake pressure trough DNi are reliably caused in the intake pressure Pm. However, when the low-lift operation is performed, the intake pressure peak UPi or the intake pressure trough DNi may not be caused in the intake pressure Pm.

Accordingly, in the second modified example of the embodiment, the pressure peak crank angle ΔθMi and the pressure trough crank angle Δθmi are obtained and stored in advance when the high-lift operation is performed. Then, when the low-lift operation is performed, the intake pressure decrease amount ΔPmdi is detected by using the pressure peak crank angle ΔθMi and the pressure trough crank angle Δθmi.

Figure 10B:
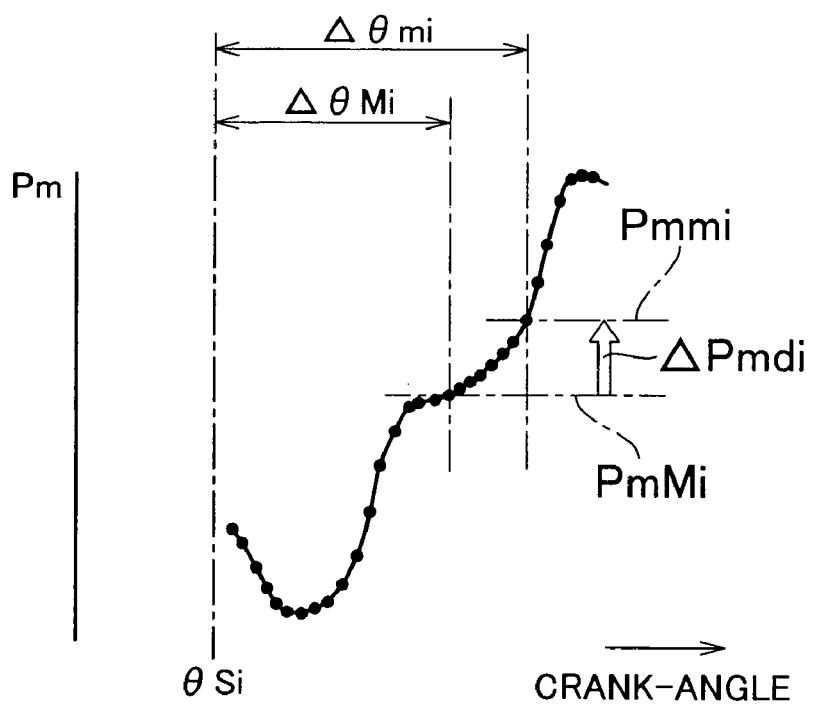

More specifically, when the high-lift operation is performed, the pressure peak crank angle ΔθMi and the pressure trough crank angle Δθmi are detected and stored. Then, when the low-lift operation is started, as shown in FIG. 10B, the intake pressure Pm is detected when the crankshaft has been rotated by the pressure peak crank angle ΔθMi since the intake valve open start timing θSi, and this detected intake pressure Pm is used as the maximum value PmMi. Similarly, the intake pressure Pm is detected when crankshaft has been rotated by the pressure trough crank angle Δθmi since the intake valve open start timing θSi, and this detected intake pressure Pm is used as the minimum value Pmmi. Next, the intake pressure decrease amount ΔPmdi is calculated according to equation (3).

Figure 11:
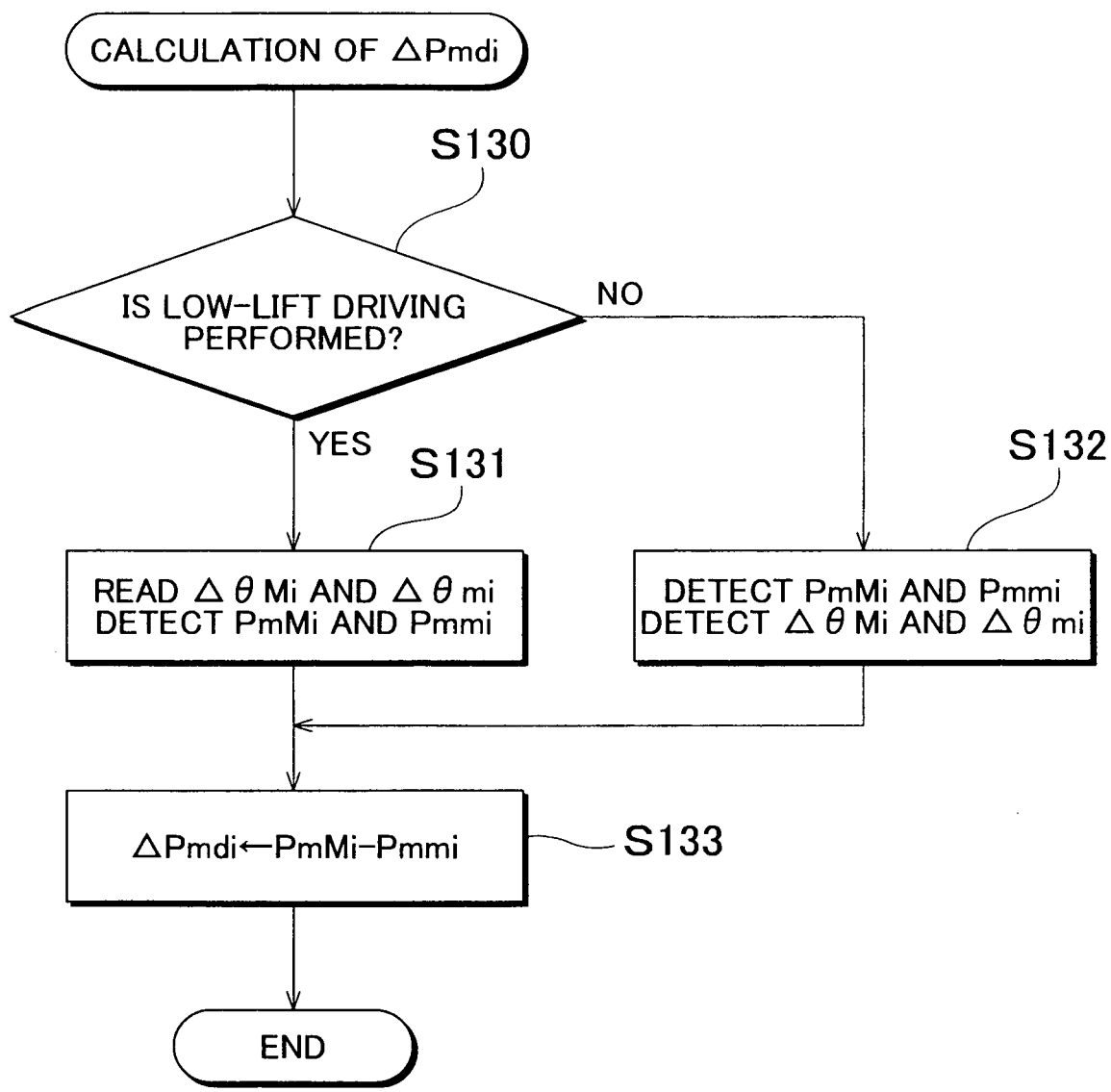
FIG. 11 illustrates the flowchart of the routine for calculating an intake pressure decrease amount $\Delta Pmdi$ in the second modified example of the embodiment.

FIG. 11 illustrates the routine for calculating the intake pressure decrease amount ΔPmdi corresponding to the "i"th cylinder in the second modified example of the embodiment. This routine is executed as an interrupt at predetermined time intervals.

As shown in FIG. 11, it is determined in step S130 whether the low-lift operation is performed. When it is determined that the high-lift operation is performed, step S132 is executed. In step S132, the maximum value PmMi and the minimum value Pmmi of the "i"th cylinder are detected, and the pressure peak crank angle ΔθMi and the pressure trough crank angle Δθmi are detected ("i"=1, 2, 3, 4, 5, 6, 7, 8). Then, step S133 is executed.

On the other hand, when it is determined in step S130 that the low-lift operation is performed, step S131 is executed. In step S131, the stored pressure peak crank angle ΔθMi and pressure trough crank angle Δθmi are read, and the maximum value PmMi and the minimum value Pmmi are detected using these pressure peak crank angle ΔθMi and the pressure trough crank angle Δθmi, respectively. Then, step S133 is executed.

In step S133, the intake pressure decrease amount ΔPmdi is calculated according to equation (3).

If the intake pressure peak UPi and the intake pressure trough DNi occur in the intake pressure Pm even when the low-lift operation is performed, the pressure peak crank angle ΔθMi and the pressure trough crank angle Δθmi at this time are detected and stored. When the intake pressure peak UPi or the intake pressure trough DNi does not occur in the intake pressure Pm, the intake pressure decrease amount ΔPmdi may be calculated using these stored pressure peak crank angle ΔθMi and pressure trough crank angle Δθmi. Even when the high-lift operation is performed, the intake pressure decrease amount ΔPmdi can be calculated using the stored pressure peak crank angle ΔθMi and pressure trough crank angle Δθmi.

Accordingly, generally speaking, the pressure peak time-interval that is the required time from the first reference time point until the intake pressure peak UPi is caused in the intake pressure, and the pressure trough time-interval that is the required time from the second reference time point until the intake pressure trough DNi is caused in the intake pressure are detected; and the intake pressure decrease amount ΔPmdi is detected based on the intake pressure PmMi, which is obtained when the pressure peak time-interval has elapsed since the first reference time point, and the intake pressure Pmmi, which is obtained when the pressure trough time-interval has elapsed since the second reference time point. In this case, the first reference time point may match the second reference time point. Alternatively, the first reference time point may be different from the second reference time point. Namely, both the first reference time point and the second reference time point may be set to the intake valve open start timing θSi. Alternatively, the first reference time point may be set to the intake valve open start timing θSi, and the second reference time point may be set to the time point (=θSi+ΔθMi) at which the intake pressure peak UPi is caused in the intake pressure Pm.

Next, the third modified example of the embodiment will be described.

Figure 12:
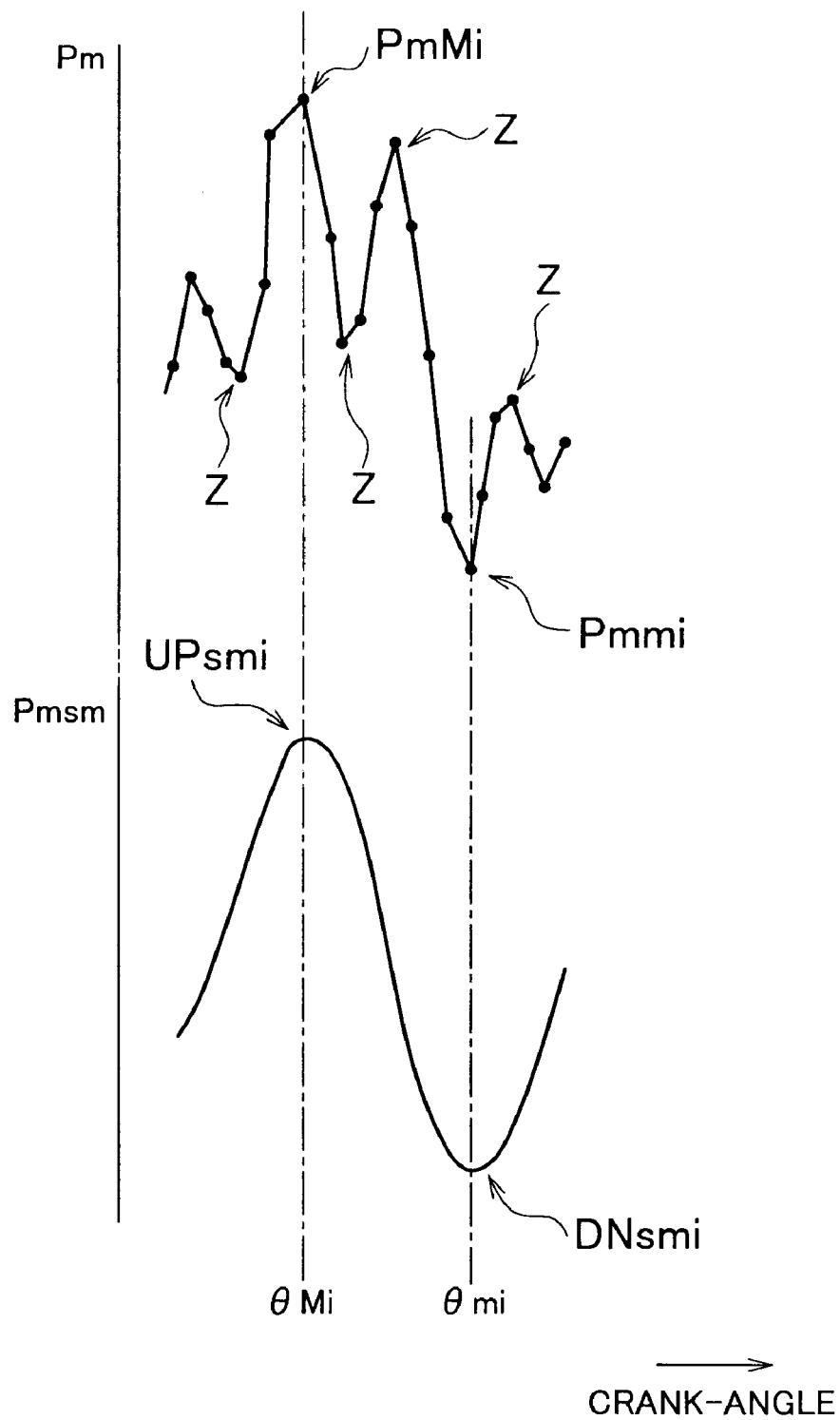
FIG. 12 illustrates the view used for describing a third modified example of the embodiment.

As shown in FIG. 12, the intake pressure Pm actually detected by the pressure sensor 40 contains noise. Accordingly, it is sometimes difficult to accurately identify the intake pressure peak UPi and the intake pressure trough DNi that occur in the intake pressure Pm due to execution of the intake stroke.

In the third modified example of the embodiment, the detected intake pressure Pm is smoothed to obtain a smoothed intake pressure Pmsm. Then, the derived pressure peak crank angle θMi corresponding to the time point at which the intake pressure peak UPi is caused in the smoothed intake pressure Pmsm, and the derived pressure trough crank angle θmi corresponding to the time point at which the intake pressure trough DNi is caused in the smoothed intake pressure Pmsm are detected. Thus, the influence of the peak caused by the noise, shown by an arrow Z in FIG. 12, can be minimized.

Next, the intake pressure Pm detected at the derived pressure peak crank angle θMi is identified. This intake pressure Pm indicates the maximum value PmMi. Similarly, the intake pressure Pm detected at the derived pressure trough crank angle θmi is identified. This intake pressure Pm indicates the minimum value Pmmi.

Next, the intake pressure decrease amount ΔPmdi is calculated according to equation (3).

In this case, the smoothed intake pressure Pmsm at the derived pressure peak crank angle θMi may be used as the maximum value PmMi, and the smoothed intake pressure Pmsm at the derived pressure trough crank angle θmi may be used as the minimum value Pmmi. However, because the smoothed intake pressure Pmsm is obtained by smoothing the intake pressure Pm, it does not accurately indicate the intake pressure Pm. Accordingly, in the third modified example of the embodiment, the intake pressure Pm detected at the derived pressure peak crank angle θMi is used as the maximum value PmMi, and the intake pressure Pm detected at the derived pressure trough crank angle θmi is used as the minimum value Pmmi.

FIG. 13 illustrates the routine for calculating the intake pressure decrease amount ΔPmdi corresponding to the "i"th cylinder in the third modified example of the embodiment. This routine is executed as an interrupt at predetermined time intervals.

As shown in FIG. 13, in step S140, the smoothed intake pressure Pmsm is calculated by smoothing the intake pressure Pm detected while the crankshaft is rotated, for example, through 720 degrees. In step S141, the derived pressure peak crank angle θMi and the derived pressure trough crank angle θmi are detected based on the smoothed intake pressure Pmsm. In step S142, the maximum value PmMi at the derived pressure peak crank angle θMi and the minimum value Pmmi at the derived pressure trough crank angle θmi are detected. In step S143, the intake pressure decrease amount ΔPmdi is calculated according to equation (3).

Next, the fourth modified example of the embodiment will be described.

Figure 14A:
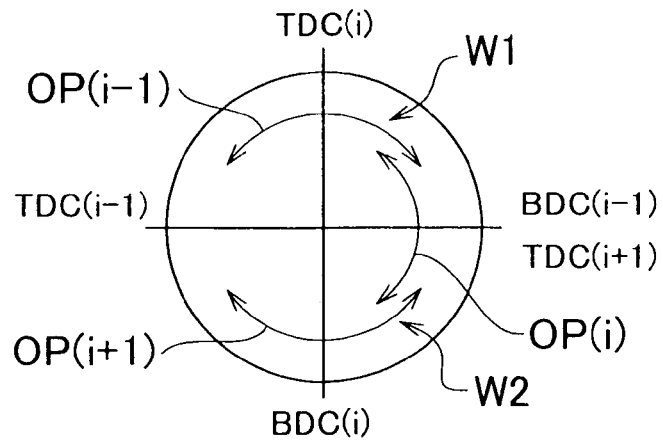
FIGS. 14A, 14B and 14C illustrate the views used for describing a fourth modified example of the embodiment.

In the internal combustion engine in FIG. 1, the intake valve open period of one cylinder overlaps with the intake valve open period of the next cylinder in the intake stroke order. Namely, as shown by "W1" in FIG. 14A, the end stage of the intake valve open period OP (i−1) of the (i−1)th cylinder overlaps with the early stage of the intake valve open period OP (i) of the "i"th cylinder. Similarly, as shown by "W2", the end stage of the intake valve open period OP (i) of the "i"th cylinder overlaps with the early stage of the intake valve open period OP (i+1) of the (i+1)th cylinder (here, the reference character "i" indicates the order of execution of the intake stroke).

However, when the intake valve open periods of the two cylinders overlap with each other, air may flow simultaneously into these two cylinders. In such a case, the cylinder, into which the air that caused the decrease in the intake pressure Pm flowed, cannot be identified. Accordingly, when the influence of such an overlap of the intake valve open periods on the intake pressure decrease amount cannot be ignored, the method described so far is not very appropriate because the intake pressure decrease amount ΔPmdi cannot always be detected accurately in such a method.

Figure 14B:
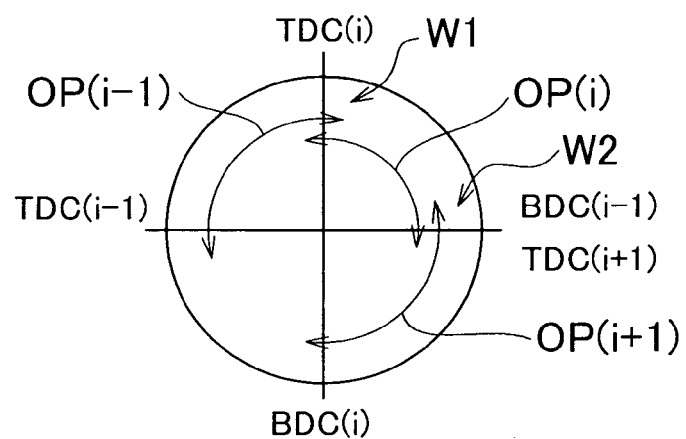
Figure 14C:
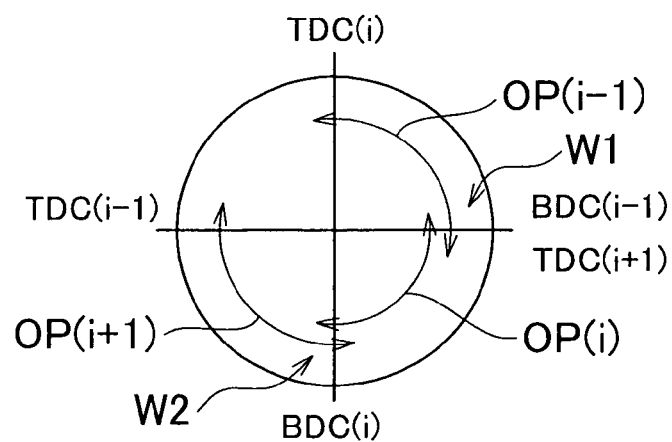

However, if the intake valve lift-amount is changed by the intake valve drive unit 50 in FIG. 1, the intake valve open start timing is changed, and the time of each of the valve overlap periods W1 and W2 is changed. As shown in FIG. 14B, when the valve overlap period W2 is near the intake top dead center TDC (i+1) of the (i+1)th cylinder, almost no air flows in the (i+1)th cylinder during the valve overlap period W2. It is, therefore, considered that the decrease in the intake pressure Pm during the valve overlap period W2 is caused by the air that flowed in the "i"th cylinder. Similarly, as shown in FIG. 14C, when the valve overlap period W1 is near the intake bottom dead center BDC (i−1) of the (i−1)th cylinder, it is considered that the decrease in the intake pressure Pm during the valve overlap period W1 is caused by the air that flowed in the "i"th cylinder.

In addition, as shown in FIG. 14B, when the valve overlap period W1 is near the intake top dead center TDC (i) of the "i"th cylinder, it is considered that the decrease in the intake pressure Pm during the valve overlap period W1 is caused by the air that flowed in the (i−1)th cylinder. As shown in FIG. 14C, when the valve overlap period W2 is near the intake bottom dead center BDC ("i") of the "i"th cylinder, it is considered that the decrease in the intake pressure Pm during the valve overlap period W2 is caused by the air that flowed in the (i+1)th cylinder.

Accordingly, in the fourth modified example of the embodiment, when the overlap timing of the intake valve open period of the "i"th cylinder and the intake valve open period of the (i+1)th cylinder is not near either the top dead center or the bottom dead center of either the "i"th cylinder or the (i+1)th cylinder, detection of the intake pressure decrease amount ΔPmdi is prohibited. On the other hand, when this overlap timing is near the top dead center or the bottom dead center of the "i"th cylinder or the (i+1)th cylinder, the intake pressure decrease amount ΔPmdi is detected. As a result, even when the intake valve open periods overlap with each other, the intake pressure decrease amount ΔPmdi can be accurately detected.

The fourth modified example of the embodiment can be also applied to the case where the intake valve open timing is changed while the intake valve lift-amount and the intake valve open period are maintained.

Figure 15:
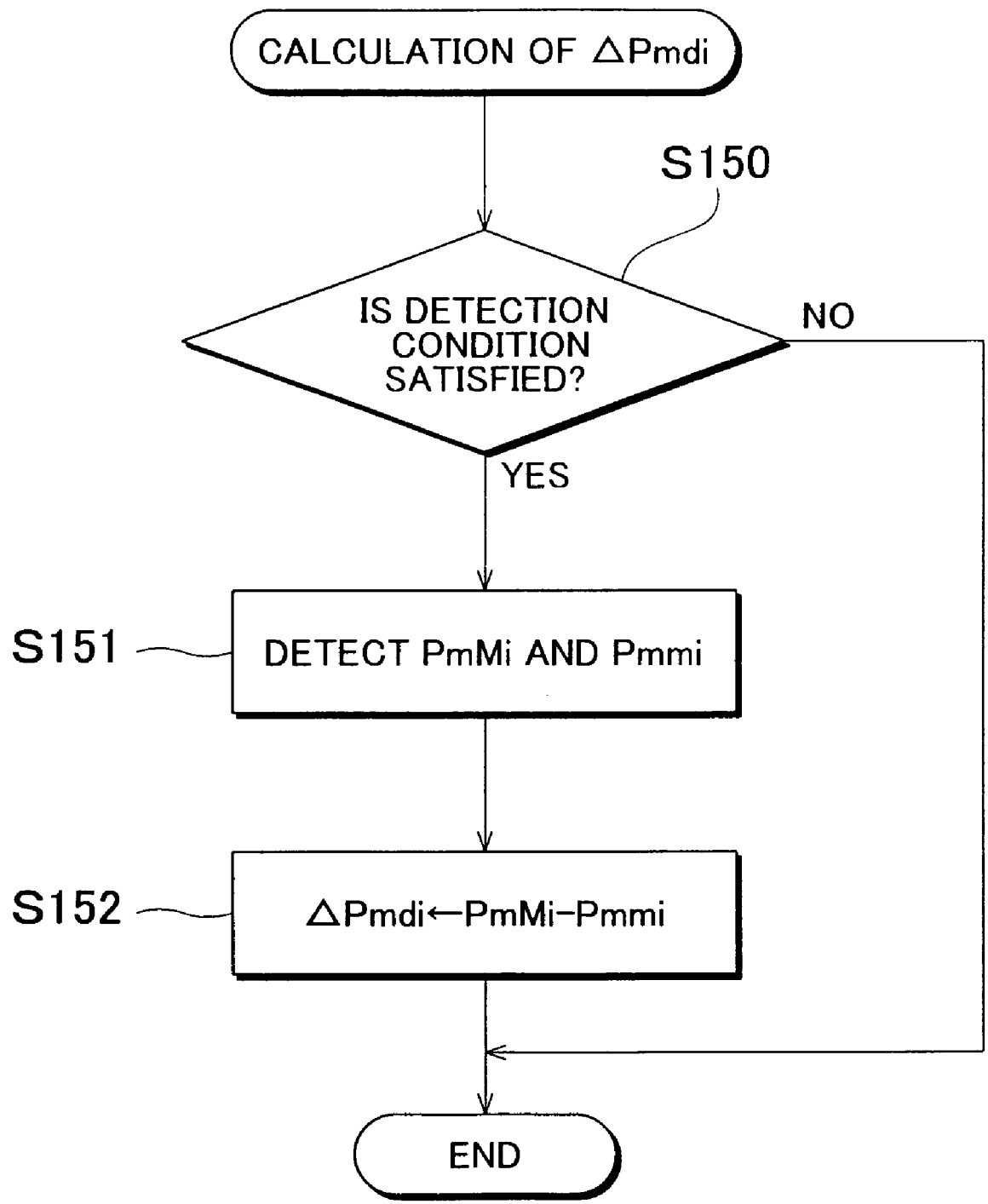
FIG. 15 illustrates the flowchart of the routine for calculating an intake pressure decrease amount in the fourth modified example of the embodiment.

FIG. 15 illustrates the routine for calculating the intake pressure decrease amount ΔPmdi corresponding to the "i"th cylinder in the fourth modified example of the embodiment. This routine is executed as an interrupt at predetermined time intervals.

As shown in FIG. 15, it is determined in step S150 whether the condition for detecting the intake pressure decrease amount ΔPmdi is satisfied. If the overlap timing of the intake valve open period of the "i"th cylinder and the intake valve open period of the (i+1)th cylinder is near the top dead center or the bottom dead center of the "i"th cylinder or the (i+1)th cylinder, it is determined that the condition is satisfied. If the overlap timing of the intake valve open period of the "i"th cylinder and the intake valve open period of the (i+1)th cylinder is not near either the top dead center or the bottom dead center of either the "i"th cylinder or the (i+1)th cylinder, it is determined that the condition is not satisfied. When it is determined that the condition is satisfied, step S151 is executed. In step S151, the maximum value PmMi and the minimum value Pmmi are detected. Next, in step S152, the intake pressure decrease amount ΔPmdi is calculated according to equation (3). On the other hand, when it is determined that the condition is not satisfied, the routine ends. Accordingly, calculation of the intake pressure decrease amount ΔPmdi is prohibited.

What is claimed is:

1. A control apparatus for an internal combustion engine in which a plurality of cylinders is provided and a lift-amount of an intake valve of each cylinder is changed based on an engine operating state, comprising:
   a detection device that detects an intake pressure decrease amount corresponding to each of the cylinders, the intake pressure decrease amount being an amount of decrease in an intake pressure caused due to execution of an intake stroke;
   a calculation device that calculates a variation in an in-cylinder supplied-air quantity, which is a quantity of air supplied in each cylinder, with each cylinder based on the detected intake pressure decrease amounts corresponding to the respective cylinders; and
   a control unit that executes engine control based on the calculated variation in the in-cylinder supplied-air quantity with each cylinder.

2. The control apparatus for an internal combustion engine according to claim 1, wherein:
   the control unit determines whether the intake pressure decrease amount of each of cylinder can be detected, and temporarily increases the lift-amount of the intake valve of each cylinder, when it is determined that the intake pressure decrease amount of at least one of the cylinders cannot be detected; and
   the detection device detects the intake pressure decrease amount of each cylinder after increasing of the lift-amount.

3. The control apparatus for an internal combustion engine according to claim 1, wherein the detection device:
   continuously detects the intake pressure;
   detects a pressure peak time-interval that is a required time from a first reference time point until an intake pressure peak occurs in the intake pressure, and a pressure trough time-interval that is a required time from a second reference time point until an intake pressure trough occurs in the intake pressure; and
   detects the intake pressure decrease amount based on the intake pressure that is detected when the detected pressure peak time-interval has elapsed since the first reference time point, and the intake pressure that is detected when the detected pressure trough time-interval has elapsed since the second reference time point.

4. The control apparatus for an internal combustion engine according to claim 3, wherein each of the first reference time point and the second reference time point is a time point at which the intake valve starts opening.

5. The control apparatus for an internal combustion engine according to claim 3, wherein the first reference time point is a time point at which the intake valve starts opening, and the second reference time point is a time point at which the pressure peak time-interval has elapsed since the first reference time point.

6. The control apparatus for an internal combustion engine according to claim 1, wherein the detection device:
   continuously detects the intake pressure;
   detects a time point at which an intake pressure peak occurs in a smoothed intake pressure that is obtained by smoothing the detected intake pressure, and a time point at which an intake pressure trough occurs in the smoothed intake pressure; and
   detects the intake pressure decrease amount corresponding to each of the cylinders based on the intake pressure detected at the detected time point at which the intake pressure peak occurs and the intake pressure detected at the detected time point at which the intake pressure trough occurs.

7. The control apparatus for an internal combustion engine according to claim 1, wherein:
   the internal combustion engine configured such that, when intake valve open periods of at least two cylinders from among the plurality of cylinders, where the intake strokes of the at least two cylinders are successively executed, overlap with each other, if the intake valve open periods of the at least two cylinders are changed, overlap timing of the intake valve open periods is changed; and
   wherein the control unit prohibits detection of the intake pressure decrease amount, when the overlap timing of the intake valve open periods is not near either a top dead center or a bottom dead center of either of the at least two cylinders.

8. A control method for an internal combustion engine, comprising:
   detecting an intake pressure decrease amount corresponding to each of the cylinders, the intake pressure decrease amount being an amount of decrease in an intake pressure caused due to execution of an intake stroke;
   calculating a variation in an in-cylinder supplied-air quantity, which is a quantity of air supplied in each cylinder, with each cylinder based on the detected intake pressure decrease amounts corresponding to the respective cylinders; and
   executing engine control based on the calculated variation in the in-cylinder supplied-air quantity with each cylinder.

9. The control method for an internal combustion engine according to claim 8, wherein:
   it is determined whether the intake pressure decrease amount corresponding to each of all the cylinders can be detected;
   a lift-amount of an intake valve of each cylinder is temporarily increased, when it is determined that the intake pressure decrease amount of at least one of the cylinders cannot be detected; and the intake pressure decrease amount of each cylinder is detected after increasing of the lift-amount.

10. The control method for an internal combustion engine according to claim 8, wherein:

the intake pressure is continuously detected;

a pressure peak time-interval that is a required time from a first reference time point until an intake pressure peak occurs in the intake pressure, and a pressure trough time-interval that a required time from a second reference time point until an intake pressure trough occurs in the intake pressure are detected; and the intake pressure decrease amount is detected based on the intake pressure that is detected when the detected pressure peak time-interval has elapsed since the first reference time point, and the intake pressure that is detected when the detected pressure trough time-interval has elapsed since the second reference time point.

11. The control method for an internal combustion engine according to claim 10, wherein each of the first reference time point and the second reference time point is a time point at which an intake valve starts opening.

12. The control method for an internal combustion engine according to claim 10, wherein the first reference time point is a time point at which an intake valve starts opening, and the second reference time point is a time point at which the pressure peak time-interval has elapsed since the first reference time point.

13. The control method for an internal combustion engine according to claim 8, wherein:

the intake pressure is continuously detected;

a time point at which an intake pressure peak occurs in a smoothed intake pressure that is obtained by smoothing the detected intake pressure, and a time point at which an intake pressure trough occurs in the smoothed intake pressure are detected; and the intake pressure decrease amount corresponding to each of the cylinders is detected based on the intake pressure detected at the detected time point at which the intake pressure peak occurs, and the intake pressure detected at the detected time point at which the intake pressure trough occurs.

14. The control method for an internal combustion engine according to claim 8, wherein:

when intake valve open periods of at least two cylinders from among the plurality of cylinders, where the intake strokes are successively executed, overlap with each other, if the intake valve open periods of the at least two cylinders are changed, overlap timing of the intake valve open periods is changed; and detection of the intake pressure decrease amount is prohibited, when the overlap timing of the intake valve open periods is not near either a top dead center or a bottom dead center of either of the at least two cylinders.

15. A control apparatus for an internal combustion engine in which a plurality of cylinders is provided and a lift-amount of an intake valve of each cylinder is changed based on an engine operating state, comprising:

detecting means for detecting an intake pressure decrease amount corresponding to each of the cylinders, the intake pressure decrease amount being an amount of decrease in an intake pressure caused due to execution of an intake stroke;

calculating means for calculating a variation in an in-cylinder supplied-air quantity, which is a quantity of air supplied in each cylinder, with each cylinder based on the detected intake pressure decrease amounts corresponding to the respective cylinders; and control means for executing engine control based on the calculated variation in the in-cylinder supplied-air quantity with each cylinder.

* * * * *